Nov. 12, 1929.  E. L. DENNIS  1,735,236
DOUGH BLENDER
Filed July 5, 1927

Inventor:
Elmer L. Dennis
By Wilson & McCanna
Attys.

Patented Nov. 12, 1929

1,735,236

UNITED STATES PATENT OFFICE

ELMER L. DENNIS, OF ROCKFORD, ILLINOIS, ASSIGNOR TO THE WASHBURN COMPANY, OF WORCESTER, MASSACHUSETTS, A CORPORATION OF MASSACHUSETTS

DOUGH BLENDER

Application filed July 5, 1927. Serial No. 203,451.

This invention relates to kitchen utensils generally but has particular reference to one designed for making pie crust where it is desired to thoroughly blend the shortening with the flour without working the same with the hands, the good blending of the dough resulting in crust of the desired flakiness.

The device of my invention has been designed not only with a view to efficiency for use in the particular kind of work referred to, but also with a view to simplicity and economy in construction, durability, ease of cleaning, and adaptability, by reason of its special shape, to fit diverse shapes of mixing bowls.

Referring to the accompanying drawing—

The utensil comprises a handle 5, preferably wooden, to the ends of which are fastened a pair of plates 6, as by means of screws 7. The plates are suitably of a soft malleable sheet iron for a reason presently to appear. A plurality of laterally spaced blade-like mixers or cutters 8 are carried by the handle on the holder plates 6. These mixers or cutters are of music wire or any other hard spring wire which may be found to be suitable for the present purpose. The hardness of the wire is taken advantage of in the fastening of the mixers or cutters, as will presently appear. At this point it will be observed that each piece of wire forming one of the mixers is bowed outwardly with reference to the handle to provide a tread portion at 9 intermediate the ends thereof. The group of mixers have the tread portions disposed out of alinement transversely, as clearly appears in Fig. 2, thus approximating an arc also bowed outwardly with reference to the handle. Thus, by reason of the longitudinal arcuateness and the transverse arcuateness, the tread portion of the utensil is substantially spherical in form. This makes the same easily adaptable to various shapes of mixing bowls, many of which will be found to conform quite closely to the shape of the tread portion of the utensil. There is, therefore, less crushing and grinding of the dough than might otherwise be the case. As a result the pie crust produced in the use of the present device is found to be much flakier than is the case with other devices available up to the present time. The flakiness is, of course, a clear evidence of the thorough blending of the shortening with the flour.

Figure 1:
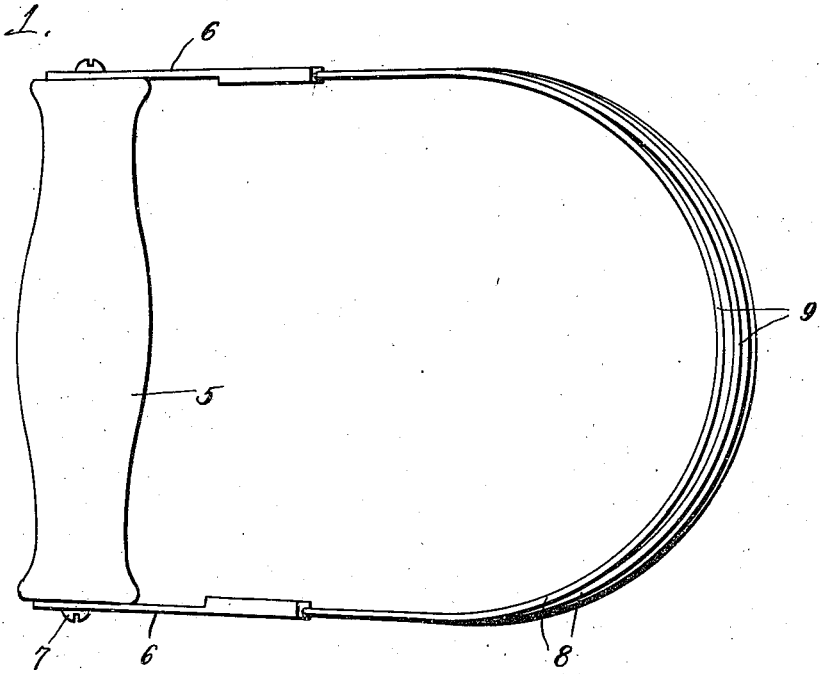
Figure 1 is a face view of a dough blender made in accordance with my invention.
Figure 2:
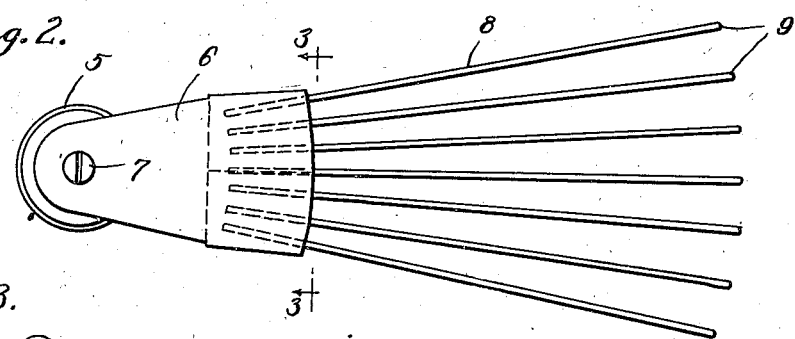
Fig. 2 is a side view of Fig. 1.
Figure 3:
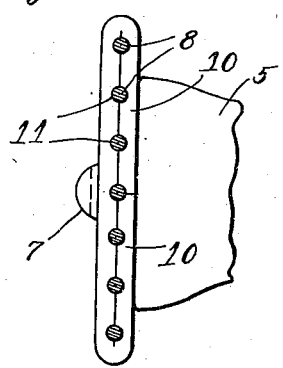
Fig. 3 is an enlarged sectional detail taken on the line 3—3 of Fig. 2 looking in the direction of the arrows.

The wire mixers or cutters 8, in order to have the proper spacing at the tread portions, diverge outwardly with respect to the handle 5. The ends of the wires as clearly appears in dotted lines in Fig. 2, are overlapped by the holder plates 6 for a substantial portion of the length thereof. Each of the holder plates is of fairly soft sheet metal and has the parts 10 arranged to be bent over the ends of the relatively hard wires to confine the same, the wires being then clamped permanently and securely in place by subjecting the plates to considerable pressure in a press or between dies. The pressure is sufficient to cause the hard wire to embed itself in the relatively soft sheet metal, as clearly appears at 11 (see Fig. 3). This method of fastening the wires is, of course, extremely cheap but is found to add to the durability of the article and does not leave crevices where particles of dough would be apt to lodge. It is, therefore, much easier to keep the article clean. The fanned out arrangement of the wires does not necessitate the use of pieces of wire of different lengths, as will be observed in Fig. 2, for the reason that the plates overlap the ends of the wires to such an extent. The covering of the raw ends of the wires is obviously of advantage in that there are no sharp edges exposed.

I claim:

1. A utensil of the character described comprising a handle, a plurality of mixers or cutters comprising pieces of hard wire each formed to provide a tread portion intermediate the ends thereof, the latter extending toward the handle in a predetermined desired relation to one another, and means for fastening the ends of said pieces to the handle comprising a pair of holders of sheet metal extending from the ends of the handle, each of said holders being arranged to overlap the ends of the wires and having at least one edge portion bent upon itself to confine the ends of the wires therebetween and conceal the same, each of said holders being pressed to embed the wires in the softer sheet metal of the holders and thereby permanently fasten the wires in place without necessitating welding or soldering thereof.

2. A utensil of the character described comprising a handle, a plurality of mixers or cutters comprising pieces of hard wire each formed to provide tread portions between the ends thereof, the latter extending toward the handle in a predetermined desired relation to one another, and means for fastening said ends to the handle comprising holders of sheet metal extending from the ends of said handle, each having its end overlapping a portion of the ends of the wires and having lateral portions bent upon itself from opposite edges thereof to overlie the ends of the wires, the said portions being pressed onto the wires to embed the latter therein to permanently fasten the same in place without necessitating welding or soldering thereof.

3. A utensil of the character described comprising a handle, a plurality of mixers or cutters comprising pieces of hard spring wire each cut to about the same length and bowed to provide tread portions between the ends thereof, the latter extending toward the handle in a predetermined desired relation to one another, and means for covering the raw ends of said wires and permanently securing the same to the handle comprising holders of sheet metal extending from the ends of said handle, each having an end portion overlapping a portion of the ends of the wires, and sheet metal parts on said holders also overlapping the same portion of the ends of the wires but from the opposite side and covering the ends of the wires, said parts and holders being pressed together to permanently grip the wires and hold the same in their predetermined desired relation to one another without necessitating welding or soldering thereof.

4. A utensil of the character described comprising a plurality of mixers or cutters formed by pieces of hard wire each of about the same length and formed to provide a tread portion intermediate the ends thereof, the said ends being disposed alongside one another in a predetermined relation, and a handle for the utensil having metallic side portions reaching therefrom toward the ends of said wires, the said side portions being formed so as to cover the raw ends of said wires from the outer side and inner side thereof and said portions being pressed to clamp the wires in place therein, there being prefer-ably a certain amount of embedding of the hard wires in the softer metal of said side portions due to the pressure whereby permanent fastening thereof is insured.

In witness of the foregoing I affix my signature.

ELMER L. DENNIS.